UNITED STATES PATENT OFFICE.

HENRY SPENCER BLACKMORE, OF MOUNT VERNON, NEW YORK.

DISINFECTING COMPOSITION.

SPECIFICATION forming part of Letters Patent No. 659,640, dated October 16, 1900.

Application filed August 28, 1899. Serial No. 728,654. (No specimens.)

*To all whom it may concern:*

Be it known that I, HENRY SPENCER BLACKMORE, a citizen of the United States, residing at Mount Vernon, in the county of Westchester and State of New York, have invented certain new and useful Improvements in a New Article of Manufacture for Disinfecting and other Purposes; and I do hereby declare the following to be a full, clear, and exact description of the invention, such as will enable others skilled in the art to which it appertains to make and use the same.

This invention relates to a new article of manufacture for disinfecting or germicide purposes; and it consists, essentially, of a mixture, compound, or solution of formic aldehyd or its polymerides in a water repellent, such as non-mineral or essential oil.

The object of my invention is to produce a liquid composition containing formic aldehyd or its polymerides which will slowly evaporate when exposed to the atmosphere at ordinary pressure and temperature and at the same time be a water repellent.

Hitherto formic aldehyd, which is a gas, has been dissolved in water, producing a solution even up to forty per cent. (40%;) but great difficulty has been experienced in separating the formic aldehyd from its aqueous solution again in active and gaseous form. A solution of formic aldehyd has also been produced in very volatile compounds soluble in water, such as ethyl chloride; but this compound is so volatile that it has to be retained in sealed tubes, and when liberated into the atmosphere at ordinary temperature and pressure it is immediately transformed into a gaseous condition.

The object of my invention therefore is to produce a compound which can be easily handled without danger of polymerization of the formic aldehyd and which is not extremely volatile, so that it can be readily exposed to the atmosphere of a room or an apartment and allowed to slowly evaporate or converted first into an aerial solution by passing a current of air in contact with it and the aerial solution ejected into the atmosphere.

The compounds which I prefer to employ as a solvent medium are volatile vegetable oils, such as camphor-oil. By this means I am enabled to produce a composition which not only has the active disinfectant formic aldehyd, but also giving off on evaporation a characteristic pleasant odor, and at the same time, being insoluble in and incompatible with water, prevents its contact therewith from deteriorating the active property of the contained formic aldehyd.

The manner in which I prefer to produce the oily formic aldehyd solution or compound is to place the desired oil, such as camphor-oil, in a proper container and expose it to the presence of formic aldehyd under increased pressure, at the same time agitating it, whereby the formic aldehyd becomes absorbed, occluded, or retained therein.

The polymerides of formic aldehyd, such as para-formaldehyd or trioxymethylene, may be dissolved in the oil, producing compounds not departing from my invention, as upon evaporation formic alhehyd is liberated and a like disinfectant result attained.

It is readily seen that by producing volatile oil solution of formic aldehyd the difficulty experienced with other compounds in liberating the formic aldehyd thereafter, its polymerization, or injury from presence of moisture is entirely avoided, as the volatile oil solution of formic aldehyd may even be emulsified and separated from water without injury of the formic aldehyd or separation from its oily solution.

The term "formic aldehyd" employed throughout this specification and claims is intended to include its polymerides or equivalents, such as trioxymethylene, as well as the formic aldehyd *per se*, and the term "essential oil" to the crude or commercial non-mineral or volatile vegetable oil as well as purified products and is intended to include water-repellent liquids of oily nature which might be artificially or synthetically prepared.

Having now described my invention, what I desire to secure by Letters Patent is—

1. A new article of manufacture a mixture containing an essential oil and formic aldehyd.

2. A new article of manufacture camphor-oil containing formic aldehyd.

In testimony whereof I affix my signature in presence of two witnesses.

HENRY SPENCER BLACKMORE.

Witnesses:
EMMA M. GILLETT,
H. N. JENKINS.